(12) United States Patent
Nedzlek

(10) Patent No.: US 10,160,045 B2
(45) Date of Patent: Dec. 25, 2018

(54) ANTI-VIBRATION DAMPER

(71) Applicant: WALTER AG, Tubingen (DE)

(72) Inventor: Kevin Nedzlek, Jefferson, WI (US)

(73) Assignee: WALTER AG, Tubingen (DE)

( * ) Notice: Subject to any disclaimer, the term of this patent is extended or adjusted under 35 U.S.C. 154(b) by 205 days.

(21) Appl. No.: 15/325,122

(22) PCT Filed: May 25, 2015

(86) PCT No.: PCT/EP2015/061490
§ 371 (c)(1),
(2) Date: Jan. 10, 2017

(87) PCT Pub. No.: WO2016/000870
PCT Pub. Date: Jan. 7, 2016

(65) Prior Publication Data
US 2017/0157683 A1    Jun. 8, 2017

Related U.S. Application Data

(60) Provisional application No. 62/018,721, filed on Jun. 30, 2014.

(51) Int. Cl.
*B23C 5/00* (2006.01)
*B23B 29/02* (2006.01)
(Continued)

(52) U.S. Cl.
CPC ............ *B23C 5/003* (2013.01); *B23B 27/002* (2013.01); *B23B 29/022* (2013.01); *B23C 5/109* (2013.01);
(Continued)

(58) Field of Classification Search
CPC ..... B23B 27/002; B23B 29/022; B23B 29/12; B23B 29/125; B23B 2250/16;
(Continued)

(56) References Cited

U.S. PATENT DOCUMENTS 2,656,742 A   10/1953  Poole
3,164,041 A *  1/1965  Carlstedt ............... B23B 29/022
                                                         408/144

(Continued)

FOREIGN PATENT DOCUMENTS

DE          1675652 B     8/1971
EP          2255909 B1   12/2013

*Primary Examiner* — Will Fridie, Jr.
(74) *Attorney, Agent, or Firm* — Corinne R. Gorski

(57) ABSTRACT

An anti-vibration damper for tools for machining of metallic work pieces is provided. For improving the damping in order to be more effective under rough includes a vibration damping device received in a hollow cylindrical space of a tool member. The vibration damping device includes a plurality of rotationally symmetrical stacked on top of each other to form a stack. A part of mutually facing upper and lower surfaces of adjacent members is spaced at a distance from each other by elastically deformable elements. The outer diameter of the stack is smaller than the inner diameter of the hollow cylindrical space of the tool member, thereby providing a cylindrical gap, which is substantially filled with spherical balls, wherein clear gap width between the inner diameter of the hollow cylindrical space and the common outer diameter of the stack deviates from any integer sum of the ball diameters.

21 Claims, 5 Drawing Sheets

(51) Int. Cl.
 *B23B 27/00* (2006.01)
 *B23C 5/10* (2006.01)
(52) U.S. Cl.
 CPC ....... *B23B 2250/16* (2013.01); *B23C 2250/16* (2013.01)
(58) Field of Classification Search
 CPC ............ B23B 2250/04; B23B 2250/08; B23B 2260/068; B23C 5/003; B23Q 11/0035; B23Q 11/0032
 See application file for complete search history.

(56) References Cited

U.S. PATENT DOCUMENTS

| | | | | |
|---|---|---|---|---|
| 3,230,833 A * | 1/1966 | Shurtliff | ................ | B23B 29/022 408/143 |
| 3,447,402 A * | 6/1969 | Ray | ....................... | B23B 29/022 408/143 |
| 4,905,776 A | 3/1990 | Beynet et al. | | |
| 5,605,420 A * | 2/1997 | Feldsine | ................. | B23C 5/006 407/32 |
| 6,537,000 B1 * | 3/2003 | Weck | ...................... | B23B 31/08 279/16 |
| 7,028,997 B2 * | 4/2006 | Takahashi | ............. | B23B 29/022 267/137 |
| 9,855,610 B2 * | 1/2018 | Frank | .................... | B23B 27/002 |
| 2006/0275090 A1 | 12/2006 | Onozuka et al. | | |
| 2007/0028716 A1 * | 2/2007 | Kawai | ................ | B23Q 11/0035 74/574.2 |
| 2011/0222975 A1 * | 9/2011 | Short | .................... | B23B 29/125 408/17 |
| 2012/0207560 A1 * | 8/2012 | Sakamaki | ............... | B23B 31/00 409/141 |
| 2013/0004250 A1 * | 1/2013 | Gamble | .................. | B23C 5/003 407/40 |
| 2015/0283628 A1 * | 10/2015 | Gamble | .................. | B23C 5/003 407/11 |
| 2016/0107242 A1 * | 4/2016 | McCormick | ........... | B23B 31/08 279/143 |
| 2016/0214182 A1 * | 7/2016 | Eichelberger | ......... | B23B 29/022 |
| 2017/0197251 A1 * | 7/2017 | Nakatani | ............... | F16F 15/126 |
| 2018/0009042 A1 * | 1/2018 | Chen | ....................... | B23C 5/003 |

* cited by examiner

ANTI-VIBRATION DAMPER

RELATED APPLICATION DATA

This application is a § 371 National Stage Application of PCT International Application No. PCT/EP2015/061490 filed May 25, 2015 claiming priority of U.S. Provisional Application No. 62/018,721, filed Jun. 30, 2014.

The present invention is related to an anti-vibration damper for tools, in particular for the machining and more particularly for chip forming machining of metallic work pieces, including a tool member having at least one hollow cylindrical space defining an axis and comprising a vibration damping device received therein including a number of rotationally symmetrical members each having an upper and a lower surface as well as a circumferential edge surface connecting the upper and lower surfaces and defining the same common diameter of said members which are stacked on top of each other about said axis.

A corresponding anti-vibration damper is known for instance from US 2013/0004250 A1, disclosing a number of weight elements in the shape of annular or more precisely hollow cylindrical disks which are received in a cavity and disposed between a stop member and a threaded fastener, including a biasing member disposed between the stop member and the plurality of weight elements, wherein at least one of the plurality of weight elements has an outside diameter that is different from the outside diameter of another one of the plurality of weight elements in order to cause the plurality of weight elements to vibrate in the cavity at a plurality of different frequencies.

A similar anti-vibration damper is known from EP 2 255 909 B1 and from U.S. Pat. No. 2,656,742 A1.

EP 2 366 481 discloses an anti-vibration damper comprising a plurality of substantially cylindrical damping elements arranged off-center and equidistantly distributed about an axis of rotation of the cutting tool.

Cutting tools including anti vibration dampers of the afore-mentioned kinds strive for providing a plurality of different resonant frequencies of different elements of the anti-vibration damper and in particular resonant frequencies deviating from any resonant frequencies which a corresponding rotating tool would have without the anti-vibration damper.

While these prior art anti-vibration dampers are effective to a certain extent in reducing the amplitudes of any vibrations of a rotating tool, in particular for balancing tools at high rotational speeds up to 20 000 rpm such measures are becoming less effective and insufficient under rough conditions, in particular upon intermittent engagement of cutting edges. The conditions under which the known anti-vibration means of rotating tools may become insufficient also depend on the moment of inertia, i.e. the particular distribution of mass around the axis of rotation including the diameter of the active portions of the tool (such as cutting elements) and the distance thereof from the bearings of a driving spindle. Moreover it has turned out that the known anti vibration dampers may be less effective for stationary applications, i. e. such as for turning operations, where substantial vibrations may as well occur due to engagement of cutting edges with a rotating or otherwise moving work piece, in particular work pieces having cavities and recesses, thereby causing intermittent engagement of cutting edges and thus potentially strong vibrations.

Accordingly, the known anti-vibration dampers require further improvements in order to be more effective under rough conditions for rotating tools in particular those having larger outer diameters (>30 mm), greater length (distance from spindle bearings to cutting elements>100 mm), higher density (>8 g/cm$^3$) of tool materials, and a resulting large moment of inertia, wherein such dampers should be further suitable for stationary tools and operations such as turning and generally for an improved damping upon machining under rough conditions and upon intermittent engagement of cutting elements which may cause substantial vibrations This object is achieved by means of an anti-vibration damper of the above-mentioned kind which is further characterized in that at least a part of the upper and lower surfaces of adjacent rotationally symmetrical members are kept at a distance to each other by means of elastically deformable elements, wherein the outer diameter of said stack of members is smaller than the inner diameter of the hollow cylindrical space of said tool member, thereby providing a cylindrical gap which is substantially filled with spherical balls each having a ball diameter, wherein the clear gap width between the inner diameter of the hollow cylindrical space and the common outer diameter of said stack of rotationally symmetric members deviates from any integer sum of the ball diameters.

The respective rotationally symmetric members may have any shape and cross section, as long as some upper and lower surfaces thereof can be defined such as to get into mutually facing arrangement and frictional engagement with each other and as long as a common outer diameter may be defined for a stack of aligned rotationally symmetric members, which may still include some minor gaps or deviations from the common outer cylindrical shape. In a preferred embodiment, the rotationally symmetrical members for instance consist of flat annular disks, in particular in the general shape of hollow cylindrical bodies.

Rather than providing elements with a variety of different resonant frequencies, the present invention puts the focus on damping by friction and dissipation of energy, thereby reducing the vibrational amplitude of any vibration. This is among others achieved by the inter engagement of a stack of rotationally symmetric members with a layer of spherical balls surrounding the stack of rotationally symmetric elements, which may have a certain play so that all elements can slightly move with respect to the other. This causes the desired friction and damping by dissipation of energy.

Preferably, each of these annular disks should have the same inner diameter and they are preferably fitted about a common central shaft centered within the hollow cylindrical space of the tool member. When fitted about a common shaft, the rotationally symmetric members preferably have some radial play with respect to the shaft which play may be bridged by another or the same elastically deformable member as the one which keeps some of the rotationally symmetric members slightly apart from each other.

The term "rotationally symmetric members" shall also include members having at least a twofold axis of symmetry, including hexagonal, octagonal and other equal sided polygonal cross sections perpendicular to the axis of symmetry, as long as the center of mass and the momentum of inertia is centered along the axis, For instance a cylindrical outer surface with some diametrically opposed facets of equal area would also meet this definition. The same holds of course for annular members, wherein in particular an inner edge surface connecting the upper and lower surfaces of such annular member may be cylindrical or alternatively of an equal sided polygonal shape.

In one embodiment, at least a part of the upper and lower surfaces of adjacent rotationally symmetric members may be in abutting, frictional engagement with each other without being kept at a distance to each other by means of elastically deformable elements.

The gap between the outer diameter of the stack of rotationally symmetric members and the wall of the hollow cylindrical space has an annular cross-section and is filled with spherical balls, the contact points of which cannot be arranged along a straight vertical or straight horizontal line, because the gap width is not an integer sum of ball diameters. Therefore, the radii of the respective spherical balls pointing to the contact points of each ball are angled with respect to each other and are not extending along a common straight line. This avoids a direct axial or radial transfer of momentum via the balls and results in the effect that any momentum or force acting on any of the respective balls along a particular direction is deflected to another direction and transferred to adjacent balls and/or the stack of rotationally symmetric members which are partly in frictional engagement and partly separated by elastic elements, so that the rotationally symmetric members as well as the balls will be slightly moved with respect to each other, thereby dissipating the energy and momentum from any forces acting on the spherical balls via the walls of the hollow cylindrical space formed in the rotatable tool member.

The basic rotational symmetry of the individual elements of the damper and their arrangement with respect to a common axis, respectively, makes the damper suitable also for rotational tools rotating at elevated speeds such as 5000 rpm.

Axially directed forces and momentums can as well not be transferred directly and straight via the balls, but are at least partly transferred to the stack of rotationally symmetric members causing friction there between while the elastically deformable elements between the rotationally symmetric members may become compressed. Moreover, by an appropriate selection of the ball diameter in relation to the inner and outer radius of the hollow cylindrical gap formed between the stack of rotationally symmetric members and the wall of the hollow cylindrical space it can be avoided that any gap free axial or circular row of balls is formed within said gap.

The relative angular arrangement of the contact points between the balls would also cause friction between the spherical balls themselves and some of the energy is thus also dissipated by frictional contact between the balls.

In one embodiment, all spherical balls have the same diameter and the gap width between the stack of rotationally symmetrical elements and the wall of the hollow cylindrical space is preferably the same at any angular position around the circumference of the stack and between 1.1 and 2.9 times the ball diameter, with the exception of the range from 1.8 to 2.2 times the ball diameter. A preferred range of the gap width is from between 1.3 and 1.8 times the ball diameter, in particular about 1.65 to 1.75 times the ball diameter.

As already mentioned, the stack of rotationally symmetric members is preferably a stack of flat annular disks, i. e, flat hollow cylindrical bodies, wherein each disk may have some bevel at the respective upper and lower inner and outer edges of the annular shape, in particular at least one bevel on at least one of the inner edges of the annular disks. The hollow cylindrical space is in one embodiment arranged along the axis of rotation of a rotatable tool member and accordingly the axis which is also the common axis of the rotationally symmetric members is aligned with the axis of rotation.

In another embodiment, not shown, there may be a plurality of hollow cylindrical spaces arranged and equally distributed about an axis of rotation, with each axis of the respective hollow cylindrical spaces being offset from the axis of rotation while the hollow cylindrical spaces each comprise the damping device comprised of rotationally symmetric members and balls as disclosed above. The arrangement of the anti vibration dampers would thus be similar or identical to the arrangement of dampers in the tool shown in FIGS. 2 and 3 of EP 2 366 481 A1, which insofar is hereby incorporated by reference.

Accordingly, the common axis of the stack of rotationally symmetric members and an axis of rotation may be either the same or offset from each other, wherein in the latter case a plurality of damping devices must be provided in symmetrical and preferably equidistant distribution around the axis of rotation if the tool is a rotating tool.

Such a tool may of course still comprise an additional hollow space with a vibration damping device as described above also within a central hollow cylindrical space aligned along the axis of rotation.

The elastic deformable members are preferably provided as O-rings having an outer diameter slightly larger than the inner diameter of the annular disks, wherein the annular disks may have a bevel along at least one inner edge, so that corresponding bevels of adjacent annular disks may form a space or gusset to receive at least a part of the O-ring, such that the respective adjacent annular disks would be kept at a small distance, i.e. not in abutting engagement with each other by the O-ring partly arranged in the gusset between the adjacent bevels.

Of course, in case the disks should not have the form of annular members but are rather full cylinders, a corresponding O-ring may still be placed between the respective front faces of adjacent cylindrical disks. The cross-section of the respective O-rings may be properly adapted and the front faces of the annular disks may have annular grooves for receiving a corresponding O-ring, wherein the depth of the grooves would still be designed such as to keep the mutually facing front faces of the disks apart from each other once an O-ring is received there between and in particular in such grooves.

The elastically deformable members may have a modulus of elasticity in the range of 2 to 10 N/mm².

The respective rotationally symmetric members are preferably comprised of a high density hard material having a density of at least 13 g/cm³, more preferably at least 16 g/cm³ in particular a hard material such as cemented carbide, for instance tungsten carbide (WC) sintered with a Co binder phase. The higher density of anti vibration elements increases the moment of inertia of the rotating device, increasing the resistance against any sudden acceleration and thus against vibrations In one embodiment, the annular members or disks may be fitted about a common shaft extending through central holes of said members. Further, when fitting the annular disks around a common shaft, it is preferred that the outer (constant) diameter of the shaft is slightly smaller than the inner diameter of the annular disks wherein elastic elements are filing the gap between the shaft and the stack of disks at least at some axial positions, thereby providing some limited radial play for the stack of disks with a centering force provided by elastic elements. Preferably, the same O-rings which are used to keep disks apart from each other by being arranged within the gusset formed by the radially inner bevels of adjacent annular disks are also serving for the purpose of keeping the stack of disks, i. e. the inner walls thereof, from directly contacting the outer wall of the common shaft.

More specifically, the disks and elastic elements are designed such as to prevent adjacent groups, in particular pairs of disks to abut each other if such an elastic element is arranged there between or at least in contact with both adjacent disk members. Further where the disks have an annular shape and are fitted about a common shaft the elastic elements are designed and arranged to prevent any direct contact between the shaft and the inner surface of the annular disks. In the remainder, the gap caused by the elastic elements between adjacent disks and/or between disks and shaft is kept as small as possible, while still ensuring that the direct contact is safely avoided even under heavy vibrational loads as they may occur upon operation.

A typical O-ring suitable for this purpose may have a cross section between 1 and 10 mm as the diameter of an O-ring material with circular cross section while the corresponding gaps between adjacent disks and between disks and central shaft may be in the order of 0.1 mm to at most 2 mm, preferably between 0.5 and 1 mm.

Keeping the gaps as small as possible, while still allowing some axial and radial play for relative movements yet preventing direct contact between the respective adjacent members by elastic elements will allow to provide more mass and thus a higher moment of inertia within the hollow portion of the damping means than with larger gaps. Still the effect of dissipation of energy between the relatively but limited moveable parts is maintained. Moreover the centering and resetting effect of elastic elements in combination with the very limited axial and radial play of all elements of the anti vibration device prevents any undesired unbalance or occurrence of products of inertia upon rotation at elevated speeds.

Apart from necessary play it is of course useful if any empty spaces in the hollow portion are avoided in as far as possible. Of course, the balls which are filled into the gap between the stack of disks and the wall of the cylindrical portion will necessarily define empty spaces there between while the gaps provided between adjacent pairs of disks and between the disks and the central shaft can be kept rather small in the order of 1 mm or less. For that purpose, the annular disks have preferably a rectangular cross-section with bevels along at least one inner edge and optionally also along the other inner edge and the outer edges. The bevels or chamfers may be rather small at the outer edges but are sufficiently large on at least one inner edge of such disk in order to receive a substantial portion of an O-ring received in the gusset between adjacent disks.

The cross section of the O-ring material does not have to be circular, but may be elliptical, square, or of any other polygonal or rounded shape.

Elastic and elastically deformable elements according to the present invention are not meant to be perfectly elastic. Rather, as it is of course the case with real, elastic elements such as commercially available O-rings having a modulus of elasticity in the order of some $N/mm^2$, they will always have internal friction and thus dissipation of energy upon any deformation.

Fulling and felting the O-rings by means of relative movements of the stack of disks and spherical balls with respect to each other and also with respect to the common shaft will thus further contribute to the dissipation of energy and momentum.

The bevel or chamfer along the inner edge of the disk hole forming a gusset together with an adjacent disk having a similar bevel or chamfer in order to receive at least a part of an O-ring may have a typical width of 1 to 3 mm, any further bevels or chamfers along the other edges of the disk may have no bevel or chamfer at all or may instead have a slightly rounded edge or bevels of a width of less than 1 mm.

The spherical balls should have a diameter in the range of $\frac{1}{20}$ to $\frac{1}{3}$, preferably in the range of $\frac{1}{15}$ or $\frac{1}{10}$ to $\frac{1}{5}$ of the outer diameter (D) of the stack of rotationally symmetric members which is of course the same diameter (D) as the diameter (D) of each individual rotationally symmetric member or disk, because the members (more particularly the disks) are aligned along a common axis. In a vast majority of applications, the corresponding disks may have an outer diameter from 10 mm to 100 mm and, in as far as provided as annular disks, an inner diameter of roughly $\frac{1}{5}$ to $\frac{1}{2}$ of the outer diameter. The height of each individual disk, which, apart from bevels or chamfers along the inner and outer edges may have a rectangular cross-section, should be in the order of $\frac{1}{10}$ to $\frac{1}{2}$ of the outer disk diameter without being limited to this range.

Considering the purpose of the spherical balls, namely to fill the hollow cylindrical gap between the stack of disks and the shaft in a substantially disordered, random arrangement, it is obvious, that the balls do not have to be perfectly spherical and may have larger tolerances as those for ball bearings, as long as the formation of straightly aligned contact points diametrically through the balls and along a row of balls is avoided.

The central shaft about which annular disks may be fitted comprises preferable a chamfer at least at one end thereof, i.e. in the shape of a truncated cone, which is in engagement with a conical end wall of the hollow cylindrical space. This conical end may be provided on a widened disk-like radial extension or head portion of the shaft to form an axial support for the stack of annular members and O-rings, wherein one O-ring may be provided between the head portion and the disk adjacent said head portion. Assuming any vibration causing slight radial movements of the stack of disks, such movement would be transferred into an axial movement of the stack of disks or at least of the shaft thereof via the engagement of the conical end of the shaft with the conical end surface of the hollow space. This in turn would cause more compression of the O-rings and increase the damping effect. Accordingly with stronger vibrations the compression of the O-rings and thus the damping effect would be increased, as well.

Further advantages and features of the present invention will become apparent upon reading of the following description of preferred embodiments in connection with the accompanying drawings.

Figure 1:
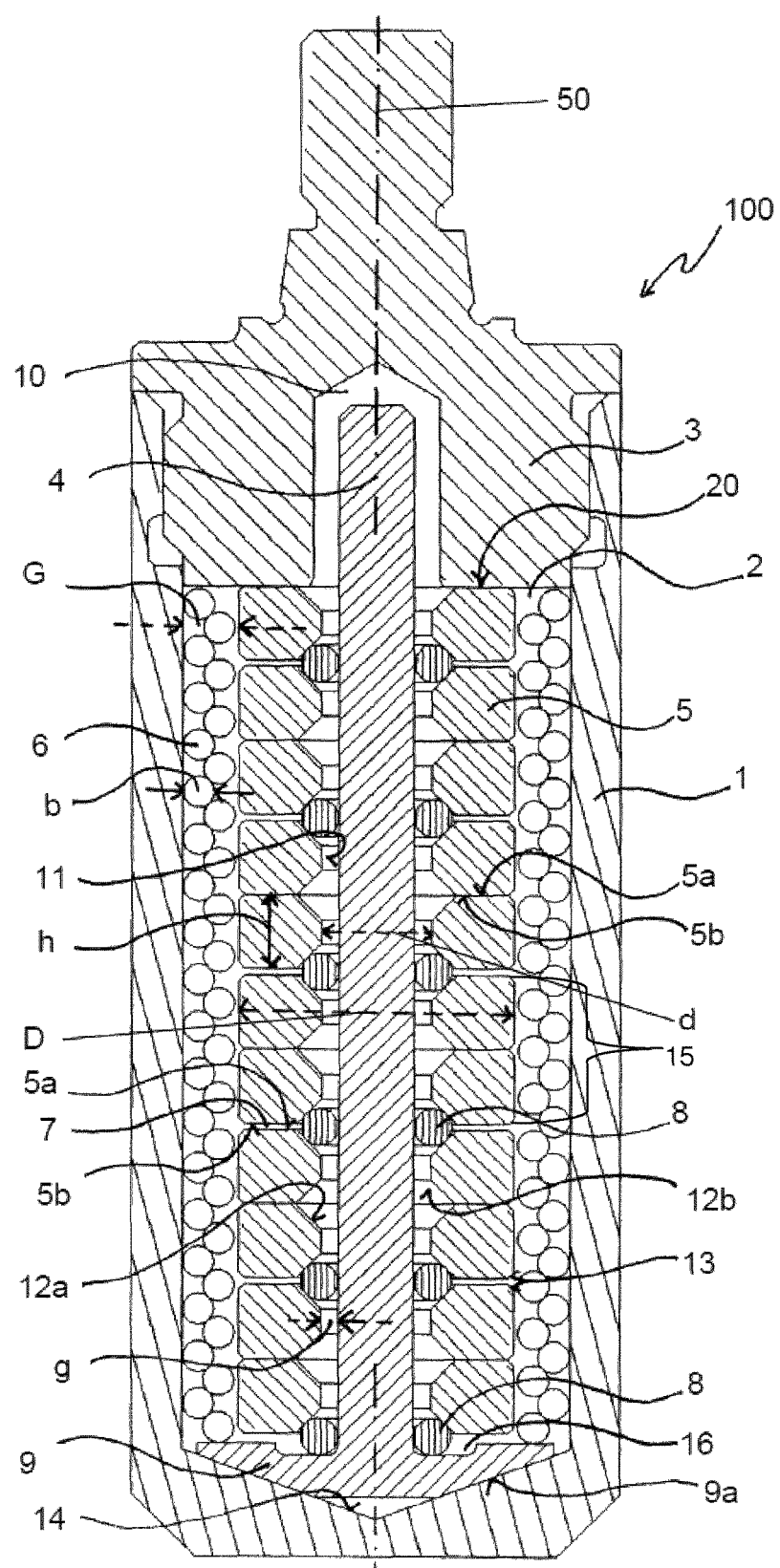
FIG. 1 is a schematic cross-sectional view of a damping device according to the present invention.

FIG. 1 shows a schematic longitudinal cross-sectional view of an anti vibration damper 100 according to the present invention, which may or may not be rotatable about an axis 50. The damping device is comprised of an outer body or housing 1 defining a hollow cylindrical space 2. The hollow cylindrical space 2 may comprise one dead end to limit the space for the damping device on that end while the other (open) end may become closed by means of a plug 3 which may be screwed into the open end of the hollow portion 2 or fixed therein by any other means, preferably in an axially adjustable manner.

A central shaft 4 is provided comprising a beveled end 4', and received with some play in a conical space 10. The opposite end of the shaft 4 is provided with a head portion 9 having a diameter larger than the inner diameter d of the disks 5, thereby providing a support for the stack of annular disks 5 and O-rings 8. The head portion 9 is chamfered or of truncated conical shape as will be described in more detail below. The lowermost O-ring is resting in an annular recess of head portion 9 and keeps the lowermost disk 5 out of direct contact with the head portion 9 of the shaft 4.

The shaft 4 is surrounded by a stack of disks 5, being comprised of pairs 15 of disks 5 which are in abutment with their mutually opposing faces 5a, 5b. The disks 5 are of an annular shape with a substantially rectangular cross-section, wherein, however, the inner edges of the disks are provided with bevels 12a, b while the outer edges of the respective annular disks only have a slight bevel or chamfer 13. O-rings 8 having a circular cross-section are provided in the gusset formed between adjacent inner bevels 12 of adjacent pairs 15 of disks which O-rings 8 at the same time are in engagement with the central shaft 4 thereby providing gaps 7 between adjacent pairs 15 of disks 5 and another gap g between the inner annular surfaces 11 of disks 5 and the outer surface of the shaft 4. As already explained, the disks 5 are arranged in pairs 15, two front faces 5a and 5b of which are in frictional abutment with each other, while a gap 7 is provided between the mutually facing surfaces 5a, 5b of adjacent pairs 15 of disks 5. Each disk 5 has an outer diameter D which in this case is roughly between 2 and 3 times of the inner diameter d of the inner surface 11.

The hollow cylindrical space 2 of the tool member 1 has a diameter D' which is larger than the diameter D by more than twice the diameter b of the spherical balls. This results in a gap width G of the hollow cylindrical space 2 between the stack of disks 5 and the inner cylindrical wall of tool member 1 which is larger than the ball diameter b. In the embodiment shown, the gap width G is about 1.7 times the ball diameter b. The gap width G is generally designed such that the spherical balls 6 which are substantially filling gap have radii to contact points forming an angle of substantially less than 180° but more than 60° with each other. This is illustratively indicated by a zigzag arrangement of the spherical balls 6 within the gap G in FIG. 1, while in reality the arrangement of balls is substantially disordered and any regular arrangements are even less preferred, while still the principal zig-zag arrangement of radii to contact points is maintained.

A reasonable upper limit of the gap width G is 1.8 times the ball diameter b in order to avoid any straight linear chain of balls and contact points there between. A reasonable lower limit for such gap width is 1.3 times the ball diameter b, while the preferred range for G is from 1.6 b to 1.75 b.

The spaces accommodating parts of the balls effectively formed between bevels or chamfers 13 at the outer edges of the disks 5 including the gap width 7 between the surfaces 5a, 5b of adjacent pairs 15 of disks 5 should be small enough in order to avoid any jamming, mutual passing or bypass contact of the balls 6, when arranged in the outer gap G between the outer surfaces of the stack of rings 5 and the inner cylindrical surface of the hollow cylindrical space 1 at the axial position of gaps 7 between disk pairs 15. Nevertheless, entering the gussets between adjacent bevels and gaps 7 on the outer diameter of the stack of disks and being repelled therefrom due to relative axial movement of the disk pairs 15 causes additional relative movement and friction between the spherical balls, which further contributes to the dissipation of vibrational energy.

Vibrational forces of the body 1 of the hollow cylindrical space will be transferred to the stack of disks 5 and the central shaft 4 via the intermediate spherical balls 6 and the O-rings 8. O-rings provide the same gap width 7 between all adjacent pairs and simultaneously the gap width g between the inner wall 11 of the disks 5 and the outer wall of the central shaft 4.

The O-rings may have a modulus of elasticity in the order of 2 to 10 $N/mm^2$.

By providing such an O-ring 8, a limited movement is allowed for the disks in relation to each other and in relation to the central shaft 4 and the balls 6. The plug 3 is axially adjusted and fixed preferably such that the stack of disks 5 and O-rings 8 is under slight to moderate compression. Depending on the particular application, even a little axial play for the stack of disks and O-rings of less than 1 mm may be acceptable, for instance for a stationary turning tool. On the other hand, a total compression of all O-rings 8 together by an amount of 0.5 to 1.5 mm has proven to be effective for a large variety of applications. In particular, a slightly stiffer arrangement and design which allows less radial movement of the individual elements may be desired for rotational tools, in particular when rotating at elevated rotational speeds (5000 rpm and higher). Of course, also the balls 6 are slightly moveable within certain limits, i. e. when the damping device 20 is fully mounted and the O-rings 8 are under slight compression, the basically zig zag arrangement of balls 6 within the Gap space G of the hollow cylindrical space 2 leaves still some axial play between at least one tenth of a mm and for instance about 2 or 3 mm. this axial play should of course correspond at least to the desired and expected further axial compression of the O-rings due to vibrations. The limited movements of balls 6, shaft 4, disks 5 and O-rings 8 thereby allowed will cause a substantial dissipation of energy and momentum due to any vibrational movement incurred upon operation of a corresponding tool, thereby improving the damping effect.

The central shaft 4 about which the annular disks 5 are fitted comprises a head 9 having the shape of a flat truncated cone, which is in engagement with a conical end wall 14 of the hollow cylindrical space. The head 9 has the general shape of a widened disk-like radial extension or head portion of the shaft to form an axial support for the stack of annular members 5, 15 and O-rings 8. One O-ring 8 is provided in a circumferential groove of the inner face of head 9 and between the head 9 and the disk 5 which is closest to said head 9. Assuming any vibration causing slight radial movements of the stack of disks 5, such movement would be transferred into an axial movement of the stack of disks or at least of the shaft 4 thereof via the engagement of the conical head 9 of the shaft with the conical end surface 14 of the hollow space 2. This in turn would cause more compression of the O-rings 8, relative movement between disks 5 and balls 6 and increase the damping effect. Accordingly with stronger vibrations, compression and release of the O-rings and thus the damping effect would be increased, as well. The cone angle of the head portion 9 determines the ratio between the amount of radial movement and the amount of axial compression of O-rings 8 and may be correspondingly adapted to the application as a stationary or slowly rotating tool and a tool rotating at elevated rotational speed, respectively.

The other end of the shaft 4 is chamfered, as well, but will in general not engage the respective end wall of the space in which the shaft is received. Fitting of the O-rings 8 about the shaft will be facilitated by the chamfer.

A plug 3 is provided and may be screwed into the open end of the hollow cylindrical space in order to limit the axial play of the stack of disks and balls. One O-ring at the other end of the stack of disks may provide some biasing force but still restricts axial movements of the stack of disks typically to some tenth of a millimeter. The central shaft 4 cannot be released from the stack of disk because one end portion of the central shaft has a head portion which is wider than the average diameter of the O-rings and preferably also wider than the inner diameter of the annular disks 5. The head of the shaft may be beveled like the other end of the shaft, wherein the whole set of damping elements is rather rigid but still allows some axial or radial and even rotational movement which causes friction in order to dissipate the energy from vibrational forces.

Figure 2:
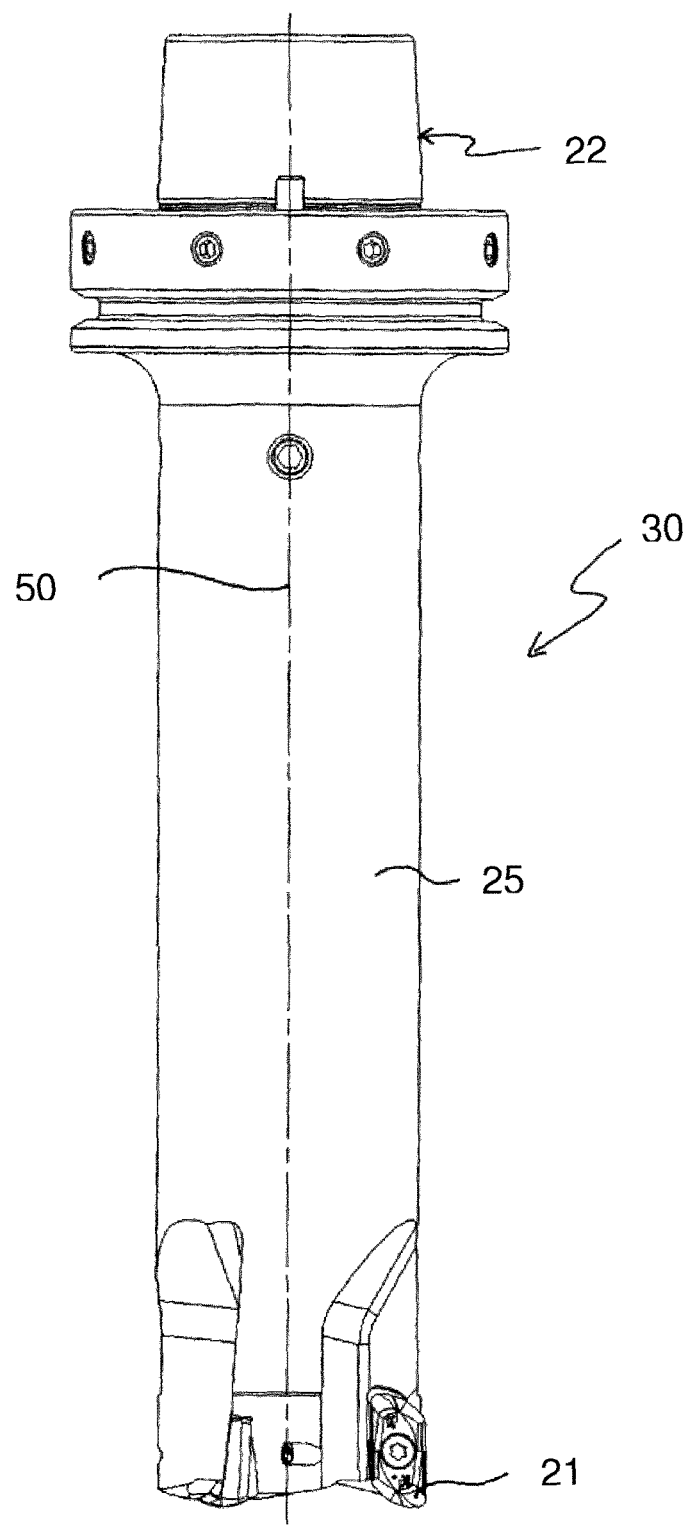
FIG. 2 is a side view of a shaft milling tool employing the present invention.
Figure 3:
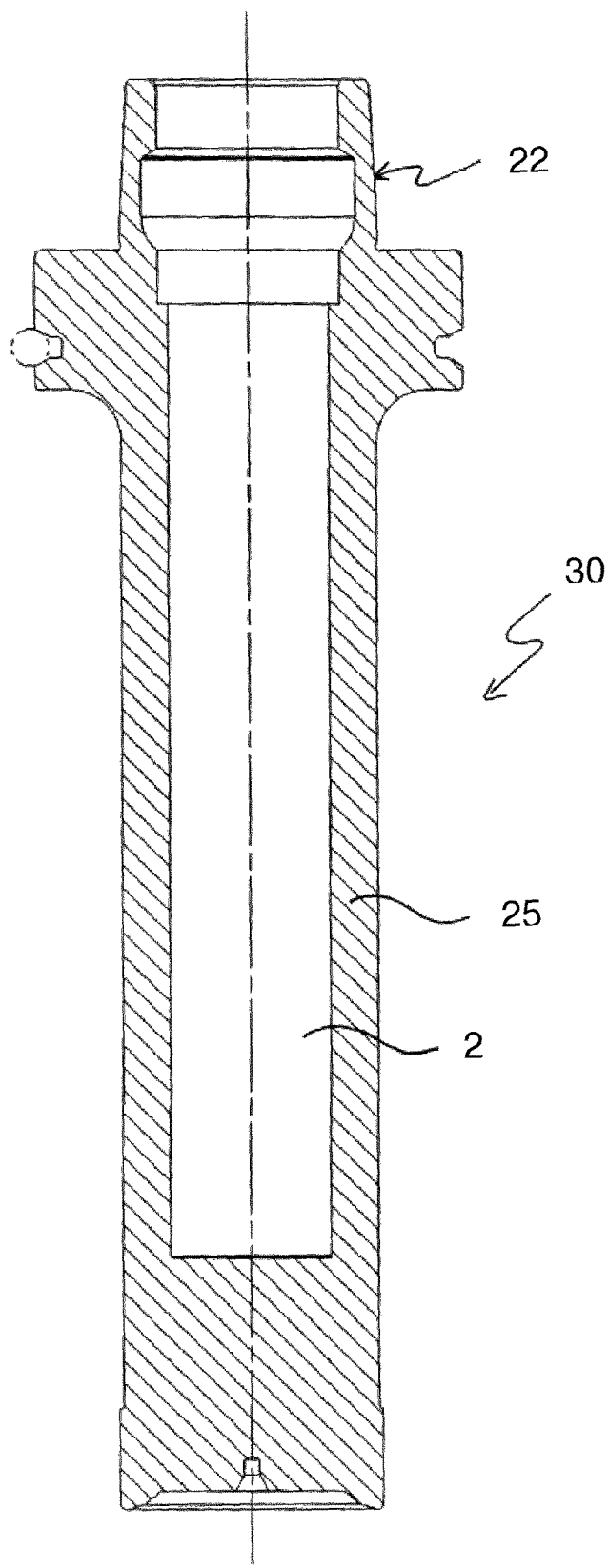
FIG. 3 is a longitudinal cross section through the tool body of the shaft milling tool of FIG. 2, showing a hollow cylindrical space for receiving a damping device.
Figure 4:
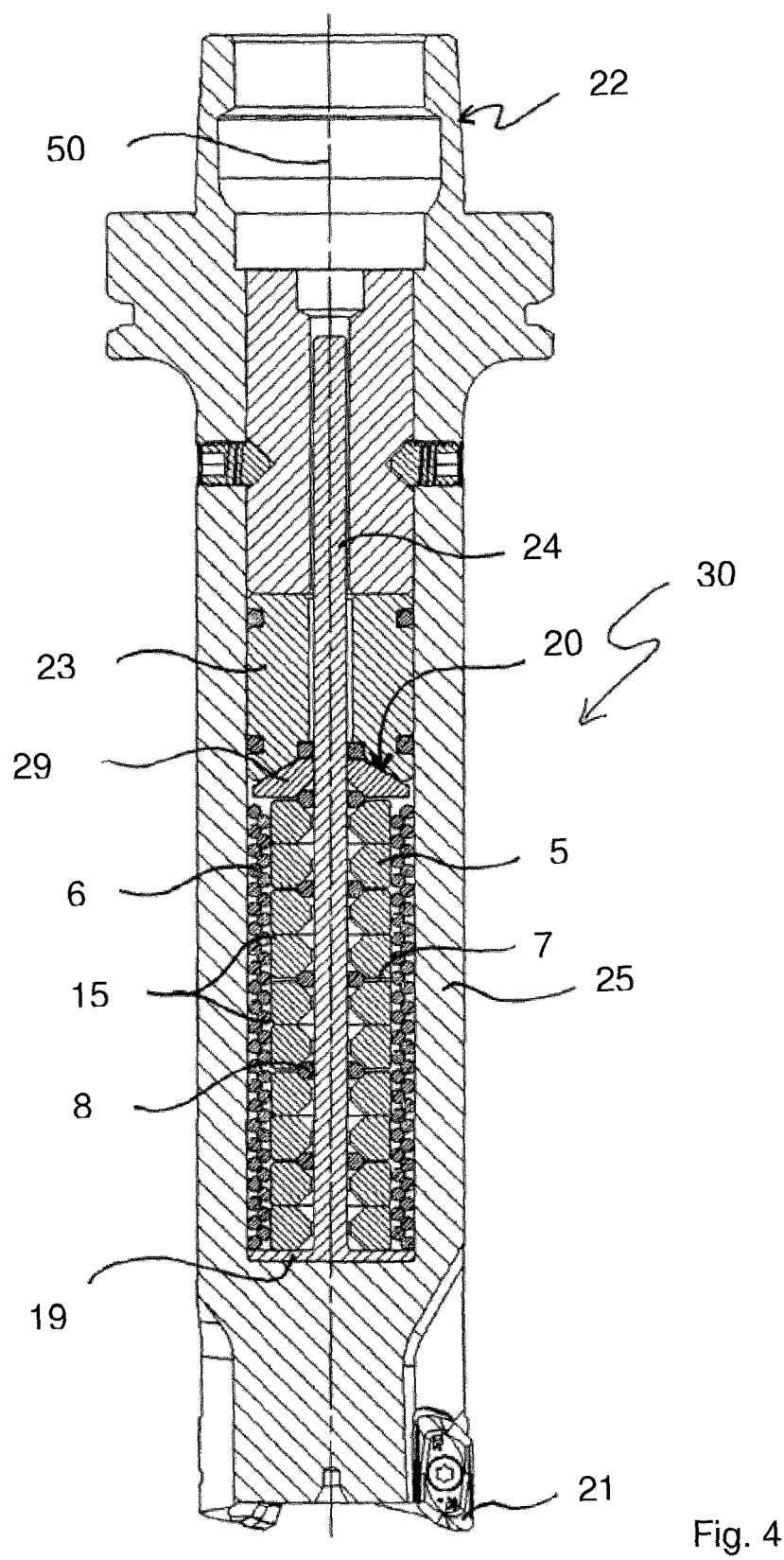
FIG. 4 is a longitudinal cross section through the shaft milling tool of FIG. 2, including a damping device received in the hollow cylindrical space.

FIGS. 2 to 4 show an alternative embodiment implementing a shaft milling cutter 30 having a shaft 25 rotatable about an axis 50 and provided with cutting elements 21 at one end thereof and a coupling 22 for being connected to a machine tool spindle on the other end. The shaft 25 of the milling cutter 30 comprises a hollow cylindrical space 2, as visible in FIG. 3 for receiving the damping device 20 as shown in FIG. 4, which is substantially the same as the damping device 20 already described in connection with FIG. 1. The hollow cylindrical space 2 is provided centrally within the tool shaft 25. Again, as visible in FIG. 3 the damping device consists of a number of pairs 15 of disks 5 stacked on top of each other wherein O-rings 8 are arranged between every other of the disks, thereby forming pairs 15 of disks 5 in abutment with each other while the respective pairs 15 are separated by a small gap 7. The outer surface of the stack of disks is substantially cylindrical and thereby provides a hollow cylindrical gap G to the inner wall of the hollow shaft 25 in which spherical balls 6 are received, the diameter b of which is selected such that the gap width G is about 1.7 times the ball diameter b, thereby causing an angled arrangement of the ball radii pointing towards the contact points with adjacent balls.

It may be noted that instead of pairs 15, any other number of disks than two may be in direct abutting relationship with each other, as long as the radial clearance of all disks 5 is restricted by elastic deformable members such as the O-rings 8.

The (inner) shaft 24 of this embodiment is different, though, by providing a flat head 19 for supporting the stack of disks 5 and O-rings 8 and the flat head 9 does not comprise a conical end. This illustrates another option according to the present invention for providing an alternating compression and release of elastic elements due to radial components of vibrations by providing a conical member (disk 29) on the opposite end of the stack of disks 5 which in this case is fitted about the shaft in an axially moveable manner with respect thereto. The conical surface of the conical disk 29 engages a corresponding inner cone of an axially adjustable plug member 23 limiting the axial space and play for the stack of disks 5 including the additional conical disk 29. The effect and function of the conical disk 9 is thus the same as that of the conical head 9 with the embodiment described in connection with FIG. 1.

Figure 5:
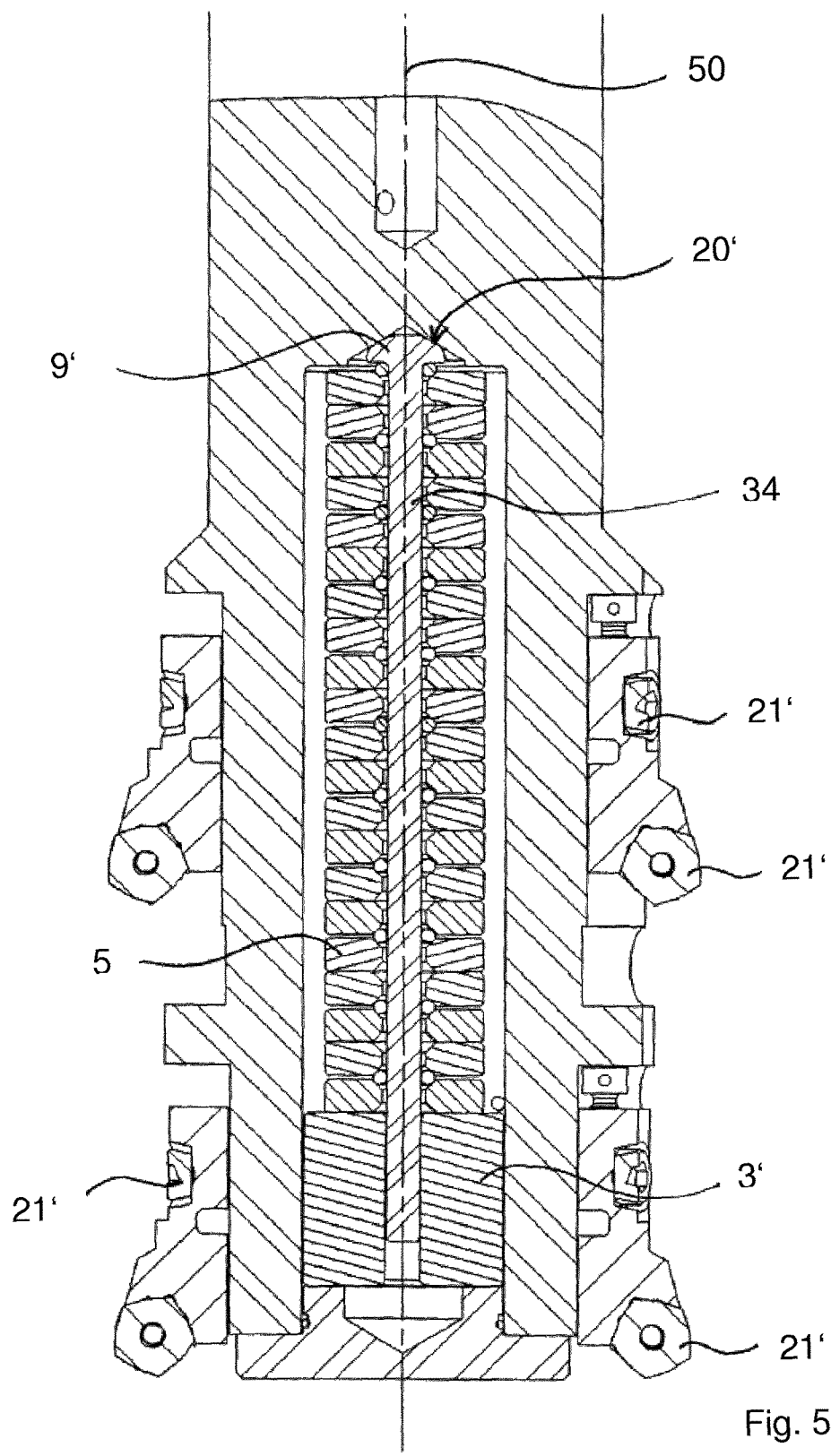
FIG. 5 is a longitudinal cross section through another embodiment of a milling tool, including parts of a slightly modified damping device received in the hollow cylindrical space.

FIG. 5 is a cross sectional view of another milling cutter 30' according to the present invention comprising a damping device 20' which is very similar to the damping device 20 already described, wherein the shaft head 9' thereof is slightly different from the conical head 9 by being rounded or nearly semispherical. Still, by engagement with a corresponding inner cone defining one end of the hollow cylindrical space 2, again any radial vibrations are transferred to axial compression and release of the O-rings 8. Another difference is the fact that this milling cutter has an open front end for inserting and fitting the damping device 20', the axial position of which is again adjusted by means of a plug 3' which may also have some elastic properties, such as for instance hard rubber or comparable material, e.g. a modulus of elasticity in the order of 10-1000 N/mm².

For the purpose of original disclosure it is to be noted that any features not forming part of the independent claims, which features may be gathered from the present description, the drawings and the claims by a person skilled in the art, even if said features may have been described only in connection with particular further features, may be combined individually as well as in arbitrary combinations with any other of the features or groups of features disclosed herein, unless this is explicitly excluded or technical conditions would render such combinations impossible or senseless. Accordingly, the size ratio between inner and outer diameter d and D, respectively, of the disks 5, the gap widths 7, g, and G, respectively, the ball diameters may be independently selected can be selected and adjusted independent of each other. Still, in the preferred embodiment, the ratio of Gap width G and ball diameter b should be selected such that diametrically opposed contact points of most of the balls with respect to adjacent balls are avoided in order to prevent a straight, elastic transfer of momentum via a chain of adjacent balls 6. The comprehensive, explicit discussion of any combinations of features which might be thought of is dispensed with just for the sake of brevity and legibility of the description and claims.

The invention claimed is:

1. An anti-vibration damper for tools for machining and chip forming machining of metallic work pieces, the anti-vibration damper comprising:
   a tool member having at least one hollow cylindrical space defining an axis; and
   a vibration damping device received in the cylindrical space, the vibration damping device including a number of rotationally symmetrical members each having an upper and a lower surface and a circumferential edge surface connecting the upper and lower surfaces and defining a same common diameter of said members which are stacked on top of each other about said axis to form a stack, wherein at least a part of said mutually facing upper and lower surfaces of adjacent members are spaced at a distance from each other by elastically deformable elements, wherein an outer diameter of said stack of rotationally symmetric members is smaller than an inner diameter of the hollow cylindrical space of said tool member thereby providing a cylindrical gap which is substantially filled with spherical balls each having a ball diameter, wherein a clear gap width between the inner diameter of the hollow cylindrical space and the common outer diameter of said stack of rotationally symmetric members deviates from any integer sum of the ball diameters.

2. The anti-vibration according to claim 1, wherein at least a part of said upper and lower surfaces of adjacent members frictionally engage each other.

3. The anti-vibration according to claim 1, wherein all of the balls have the same common ball diameter and the clear gap width is between 1.2 to 1.80 and 2.20 to 2.8 times the ball diameter.

4. The anti-vibration according to claim 1, wherein the ball diameter is in the rage of 1/20 to 1/3 of the outer diameter of the stack of rotationally symmetric members.

5. The anti-vibration according to claim 1, wherein the common axis is aligned along an axis of rotation of a rotatable tool member.

6. The anti-vibration according to claim 1, wherein said rotationally symmetric members comprise have a substantially cylindrical outer surface.

7. The anti-vibration according to claim 1, wherein the rotationally symmetric members are formed in the shape of annular disks.

8. The anti-vibration according to claim 1, wherein the elastically deformable elements having a modulus of elasticity in the range of 2 to 10 N/mm².

9. The anti-vibration according to claim 1, wherein the rotationally symmetric members are comprised of high density hard material having a density of at least 13 g/cm³, such as cemented carbide.

10. The anti-vibration according to claim 1, wherein each of the circular disks includes a central hole of the same diameter, wherein the disks are fitted about a common shaft extending through said central holes.

11. The anti-vibration according to claim 1, wherein the inner edges of at least some the disks are chamfered.

12. The anti-vibration according to claim 1, wherein the inner diameter of the disk holes is larger than outer diameter of the common shaft, wherein O-rings are provided between the shaft and the disks, said O-rings having a cross section which has a larger minimum diameter than the difference between a shaft radius and radius of disk holes, the O-rings being provided in a gusset formed by chamfered edges of adjacent disks and a wall of the shaft, such that the mutually facing surfaces of said disks are spaced by said O-rings and a cylindrical gap is formed between the inner walls of the disk holes and the cylindrical shaft which gap is bridged by at least a part of the cross section of said O-rings.

13. The anti-vibration according to claim 1, wherein the chamfered edges of the disk holes are provided at least on one side of each disk and the disks are stacked in pairs with mutually facing surfaces being in contact with each other while adjacent pairs of disks are spaced apart by said elastic O-rings.

14. The anti-vibration according to claim 1, wherein the disk and shaft arrangement is axially floating within a small clearance inside the hollow cylindrical space and in particular rotatable within a layer of balls surrounding the stack of disks.

15. The anti-vibration according to claim 1, wherein the shaft comprises includes a widened head portion or supporting disk with a chamfered or truncated conical end surface in engagement with a conical end wall of the hollow cylindrical space.

16. The anti-vibration according to claim 14, wherein the axial ends of the hollow cylindrical space are closed to limit axial play of the stack of disks and the surrounding layer of balls.

17. The anti-vibration according to claim 1, wherein one end of the hollow cylindrical space is closed by a removable and adjustable plate or plug.

18. The anti-vibration according to claim 1, comprising a plurality of hollow cylindrical spaces including damping means, said hollow spaces being arranged symmetrically with respect of an axis of rotation and with their axes parallel thereto.

19. A rotatable tool for the machining of metallic work pieces, comprising:
a hollow cylindrical space defining an axis; and
an anti-vibration damping device disposed in the cylindrical space, the anti-vibration damping device including a plurality of rotationally symmetrical members each having an upper and a lower surface and a circumferential edge surface connecting the upper and lower surfaces and defining a same common diameter of said members, which are stacked on top of each other about said axis to form a stack, wherein at least a part of said mutually facing upper and lower surfaces of adjacent members are spaced at a distance from each other by elastically deformable elements, wherein an outer diameter of said stack of rotationally symmetric members is smaller than an inner diameter of the hollow cylindrical space of said tool member thereby providing a cylindrical gap which is substantially filled with spherical balls each having a ball diameter, wherein a clear gap width between the inner diameter of the hollow cylindrical space and the common outer diameter of said stack of rotationally symmetric members deviates from any integer sum of the ball diameters.

20. A stationary tool for machining and/or turning of metallic work pieces, comprising:
a hollow cylindrical space defining an axis; and
an anti-vibration damping device disposed in the cylindrical space, the anti-vibration damping device including a plurality of rotationally symmetrical members each having an upper and a lower surface and a circumferential edge surface connecting the upper and lower surfaces and defining a same common diameter of said members, which are stacked on top of each other about said axis to form a stack, wherein at least a part of said mutually facing upper and lower surfaces of adjacent members are spaced at a distance from each other by elastically deformable elements, wherein an outer diameter of said stack of rotationally symmetric members is smaller than an inner diameter of the hollow cylindrical space of said tool member thereby providing a cylindrical gap which is substantially filled with spherical balls each having a ball diameter, wherein a clear gap width between the inner diameter of the hollow cylindrical space and the common outer diameter of said stack of rotationally symmetric members deviates from any integer sum of the ball diameters.

21. The anti-vibration damper according to claim 3, wherein the clear gap width is between 1.2 to 1.65 and 1.75 to 2.8 times the ball diameter.

* * * * *